United States Patent
Austen et al.

(10) Patent No.: US 8,892,714 B2
(45) Date of Patent: Nov. 18, 2014

(54) MANAGING INVENTORY DATA FOR COMPONENTS OF A SERVER SYSTEM

(71) Applicant: International Business Machines Corporation, Armonk, NY (US)

(72) Inventors: Christopher H. Austen, Pflugerville, TX (US); Thomas M. Brey, Cary, NC (US); William M. Edmonds, Durham, NC (US); Jeffrey M. Franke, Apex, NC (US); Edward J. Klodnicki, Durham, NC (US); James A. O'Connor, Ulster Park, NY (US); Nicholas M. Williamson, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/708,029

(22) Filed: Dec. 7, 2012

(65) Prior Publication Data

US 2013/0097314 A1    Apr. 18, 2013

Related U.S. Application Data

(63) Continuation of application No. 13/177,704, filed on Jul. 7, 2011.

(51) Int. Cl.
*G06F 15/16* (2006.01)
*G06F 15/173* (2006.01)
*H04L 29/08* (2006.01)

(52) U.S. Cl.
CPC ........ *H04L 29/08099* (2013.01); *G06F 15/161* (2013.01)
USPC ............................ 709/223; 709/217; 709/219

(58) Field of Classification Search
USPC ......................................... 709/223, 217, 219
See application file for complete search history.

(56) References Cited

U.S. PATENT DOCUMENTS

| | | | |
|---|---|---|---|
| 6,339,546 B1 | 1/2002 | Katayama et al. | |
| 6,976,112 B2 | 12/2005 | Franke et al. | |
| 7,191,347 B2 | 3/2007 | Bigelow et al. | |
| 7,295,446 B2 | 11/2007 | Crippen et al. | |

(Continued)

FOREIGN PATENT DOCUMENTS

WO    2007064466 A2    6/2007

OTHER PUBLICATIONS

U.S. Appl. No. 13/177,704 entitled, "Managing Inventory Data for Components of a Server System", filed Jul. 7, 2011.

(Continued)

*Primary Examiner* — Jerry Dennison
*Assistant Examiner* — Adam Cooney
(74) *Attorney, Agent, or Firm* — Patterson & Sheridan LLP

(57) ABSTRACT

Techniques are disclosed for managing inventory data for components of a server system. In one embodiment, a global management controller is provided, that is operatively connected to a plurality of local management controllers. Each local management controller is configured to manage a subset of the components of the server system. Each local management controller is also configured to generate, for each component, a checksum based on vital product data (VPD) of the component. Each local management controller is also configured to compute a composite checksum based on the checksums generated for the components in the subset. The global management controller is configured to maintain a global view of the VPD in the computer system, based on the checksums and/or composite checksums.

20 Claims, 10 Drawing Sheets

(56) References Cited

U.S. PATENT DOCUMENTS

| | | |
|---|---|---|
| 7,310,306 B1 | 12/2007 | Cheriton |
| 7,356,638 B2 | 4/2008 | Holland et al. |
| 7,359,317 B1 | 4/2008 | DeCesare et al. |
| 7,418,633 B1 | 8/2008 | Salpekar et al. |
| 7,529,819 B2 | 5/2009 | Chen et al. |
| 7,636,823 B1 | 12/2009 | Fiske et al. |
| 8,250,382 B2 * | 8/2012 | Maglione et al. ............. 713/300 |
| 8,433,190 B2 | 4/2013 | Wellbrock et al. |
| 2002/0080575 A1 | 6/2002 | Nam et al. |
| 2002/0091969 A1 | 7/2002 | Chen et al. |
| 2002/0097672 A1 | 7/2002 | Barbas et al. |
| 2002/0124114 A1 | 9/2002 | Bottom et al. |
| 2004/0255190 A1 | 12/2004 | Sidhu et al. |
| 2007/0083707 A1 | 4/2007 | Holland et al. |
| 2008/0056123 A1 | 3/2008 | Howard et al. |
| 2008/0288685 A1 | 11/2008 | Dalton et al. |
| 2010/0165983 A1 | 7/2010 | Aybay et al. |
| 2012/0117040 A1 * | 5/2012 | Hostetter et al. ............. 707/697 |
| 2012/0170191 A1 | 7/2012 | Jensen et al. |
| 2013/0094348 A1 | 4/2013 | Armstrong et al. |
| 2013/0094351 A1 | 4/2013 | Armstrong et al. |
| 2013/0100799 A1 | 4/2013 | Armstrong et al. |
| 2013/0103329 A1 | 4/2013 | Armstrong et al. |

OTHER PUBLICATIONS

U.S. Appl. No. 13/177,611 entitled, "Reducing Impact of a Repair Action in a Switch Fabric", filed Jul. 7, 2011.

U.S. Appl. No. 13/177,623 entitled, "Reducing Impact of Repair Actions Following a Switch Failure in a Switch Fabric", filed Jul. 7, 2011.

U.S. Appl. No. 13/177,639 entitled, "Reducing Impact of a Switch Failure in a Switch Fabric Via Switch Cards", filed Jul. 7, 2011.

U.S. Appl. No. 13/177,680 entitled, "Switch Fabric Management", filed Jul. 7, 2011.

Combined Search and Examination Report from the United Kingdom Intellectual Property Office dated Aug. 29, 2012.

* cited by examiner

US 8,892,714 B2

MANAGING INVENTORY DATA FOR COMPONENTS OF A SERVER SYSTEM

CROSS-REFERENCED TO RELATED APPLICATIONS

This application is a continuation of co-pending U.S. patent application Ser. No. 13/177,704, filed Jul. 7, 2011. The aforementioned related patent application is herein incorporated by reference in its entirety.

BACKGROUND

Although early computer architectures used standalone, single computers, often referenced as Personal Computers (PCs), more powerful modern computer systems often use multiple computers that are coupled together in a common chassis. An exemplary common chassis is known as a blade chassis, which includes multiple server blades that are coupled by a common backbone within the blade chassis. Each server blade is a pluggable board that includes at least one processor, on-board memory, and an Input/Output (I/O) interface. The multiple server blades are configured to communicate with one another and to share common resources such as storage devices, monitors, input devices, etc. Further, one or multiple blade chassis may make up a blade system, which is often dedicated to a single enterprise and/or a particular function, such as processing loans, managing payroll, etc.

SUMMARY

Embodiments of the invention provide a computer-implemented method, computer program product and system for performing an operation that includes, from a first local management controller of a plurality of local management controllers operatively connected to a global management controller configured to manage a plurality of components, each component having associated vital product data (VPD), receiving: (i) VPD of a first component in the subset managed by the first local management controller and (ii) a first checksum generated based on the VPD of the first component, where each local management controller is configured to manage a respective subset of the plurality of components. The operation also includes storing the VPD and the first checksum of the first component. The operation also includes receiving, from the first local management controller, an indication that the VPD has changed, wherein the indication specifies a second checksum generated based on the changed VPD of the first component. The operation also includes, responsive to the indication, determining whether the stored VPD is up-to-date by comparing the second checksum with the stored checksum.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
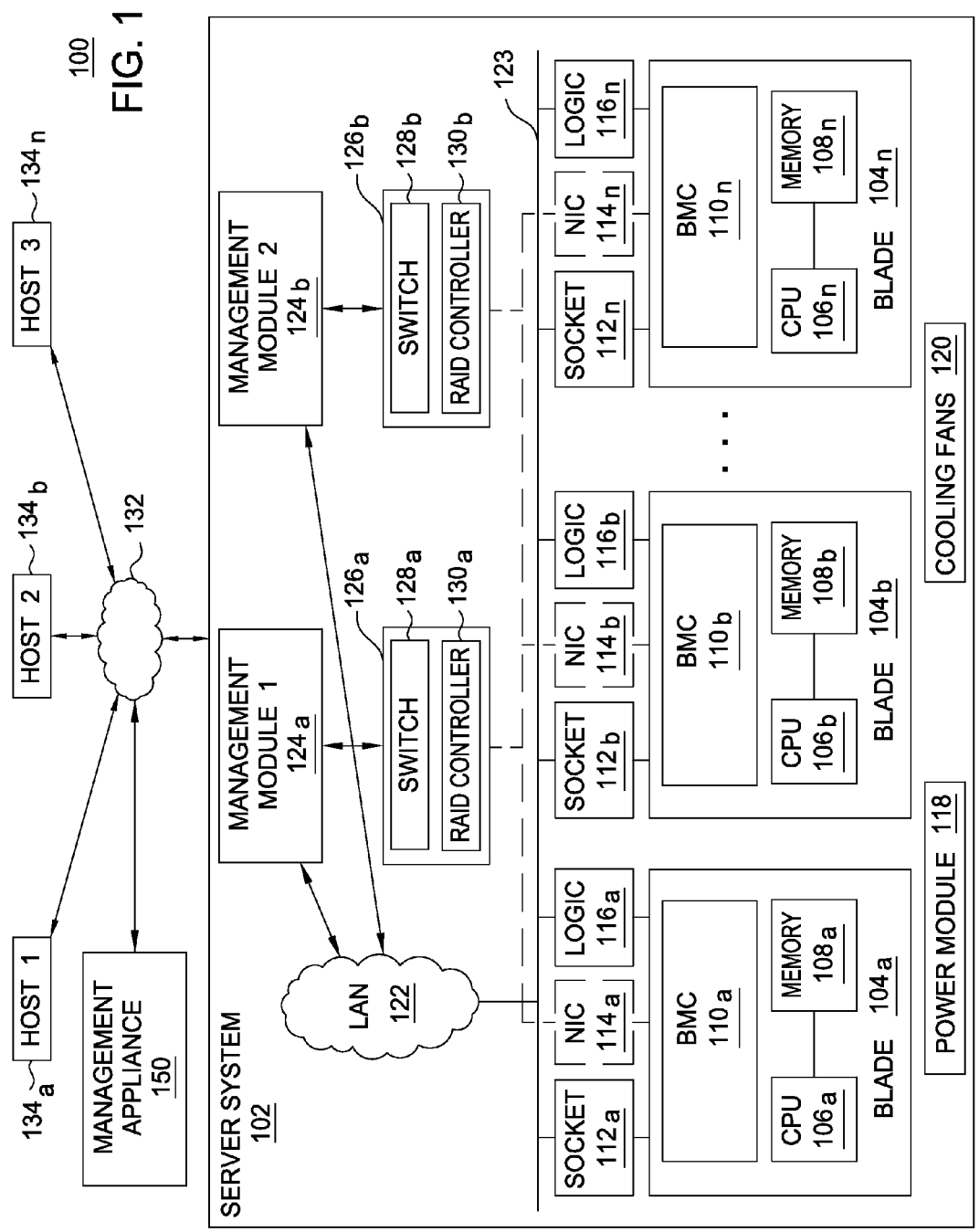
FIG. 1 is a block diagram of a computing environment having several hosts and a management appliance with access to a server system, according to one embodiment of the invention.

Embodiments of the invention provide techniques for managing inventory data for components of a server system. The server system may include one or more server cards operatively connected to a midplane. Each server card includes one or more computer processors and a memory. For example, each server card may be a server blade, also referred to as a blade server or blade. One embodiment of the invention provides a network appliance operatively connected to the server system. The network appliance includes a global management controller, and the server system includes a plurality of local management controllers. Each local management controller is configured to manage a respective subset of the components of the server system. The subset of components managed by a local management controller may also be referred to as the management scope of the local management controller. The components include server components and enclosure components. Each component has associated vital product data (VPD). As used herein, the VPD of a component refers to any data characterizing the component, that the component is configured to provide responsive to a request. Examples of VPD include serial numbers, part numbers, model numbers, version numbers, component names, manufacturer names, universally unique identifiers (UUIDs), etc.

In one embodiment, the global management controller communicates with the local management controllers to provide a global view of VPD of all components in the server system. The global management controller may provide the global view to one or more users and/or applications. The global view may facilitate functions of a systems management application for the server system. To this end, in some embodiments, the global management controller and/or the local management controllers store, in a local cache, a copy of VPD of managed components. Storing a local copy of VPD may reduce delays associated with retrieving the VPD responsive to a request by an application and/or a user.

In one embodiment, each local management controller generates and/or maintains local inventory data for the server system. The local inventory data includes the local copy of the VPD of each component managed by the respective local management controller. The local inventory data also includes, for each component, a checksum generated based on the VPD of the respective component. Depending on the embodiment, the checksum may be generated based on all VPD of the respective component or based on only a predefined subset of the VPD, where the predefined subset is specified by a user. Upon a change in the VPD of a component, the local management controller managing the component generates a new checksum based on the changed VPD. The local inventory data may also include a composite checksum that is generated based on checksums of all components managed by the local management controller.

In one embodiment, the global management controller generates and/or maintains global inventory data for the server system. The global inventory data includes the local copy of the VPD for each component in the server system and the checksum generated for the components in the server system. The global inventory data also includes the composite checksums generated by each local management controller in the server system. In one embodiment, the global management controller and the local management controllers are configured to use these checksums to keep the global inventory data current, relative to the local inventory data of each local management controller. For example, the global management controller may use the checksums and/or composite checksums to determine whether the VPD for a component in the global inventory data should be updated using VPD received from the local management controller managing the component. In some instances, the checksums and/or composite checksums may be used to prevent unchanged VPD from being requested by the global management controller and/or sent by the local management controller. Accordingly, the amount of network traffic and/or processing performed by the global management controller and the local management controllers may be reduced at least in some cases. In particular, the amount of network traffic may be reduced, relative to an alternative embodiment in which only the VPD—and not the checksums—is used to keep the global inventory data up-to-date. For instance, in the alternative embodiment, the global management controller may periodically poll for VPD from each local management controller and update the global inventory data with any changed VPD. Further, the reduction in network traffic may be significant in particular cases, such as where the size of the VPD vastly exceeds the size of the checksums and/or composite checksums, where the count of components having VPD vastly exceeds the count of local management controllers, etc.

In one embodiment, the local inventory data and/or the global inventory data are stored in persistent storage. At least in some cases, coupling the use of checksums with storing inventory data in persistent storage may reduce the amount of network traffic that occurs upon restarting the global management controller, relative to an alternative embodiment in which the global inventory data is lost upon each restart. In the alternative embodiment, the global management controller regenerates the global inventory data upon each restart. The global inventory data is regenerated using VPD for all components, received from the local management controllers via the network.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram of a computing environment 100 having several hosts and a management appliance with access to a server system 102, according to one embodiment of the invention. Although only three hosts 134a,b,n are depicted for clarity, those skilled in the art will appreciate that additional hosts may have access to the server system 102. The hosts 134a,b,n and the management appliance 150 are connected through a network fabric 132 to the server system 102. Depending on the embodiment, each host 134a,b,n may act as a client that accesses functionality provided by the server system 102 and/or may provide respective server functionality external to the server system 102. The network fabric 132 may be a telecommunications network and/or a wide area network (WAN). In a particular embodiment, the network fabric 132 is the Internet. The server system 102 includes a chassis that houses server blades 104a,b,n. The server blades 104a,b,n are coupled to a midplane 123, which provides mechanical and logical connections (e.g., data and control signal interchange) among the server blades 104a,b,n. Although three server blades 104a,b,n are depicted, those skilled in the art will appreciate that additional server blades may be connected to the midplane 123. Further, although embodiments are described herein with reference to blade systems, other form factors or physical configurations (e.g., rack systems) are broadly contemplated.

Further, although embodiments are described herein with reference to the server blades 104a,b,n being coupled to the midplane 123, those skilled in the art will recognize that more generally, the server blades may be coupled to any printed circuit board (PCB) that serves as a backbone for the chassis, such as a backplane, motherboard, etc. Further still, although embodiments are described herein with reference to the server system 102 having a single chassis, those skilled in the art will recognize that in other embodiments, the server system 102 may include multiple chassis. For example, in an alternative embodiment, the server system 102 may be a blade system that includes at least two blade chassis, each having a plurality of blades.

In one embodiment, the server system 102 further includes one or more management modules 124. In the depicted embodiment, the server system 102 includes a primary management module 124a and a backup management module 124b. Each management module 124 is capable of managing multiple server blades 104. During normal operation, one of the management modules 124 is operatively connected to the server blades 104 via a local area network (LAN) 122, the midplane 123 and a Baseboard Management Controllers (BMCs) 110 of each server blade 104 to form an in-band management pathway. In one embodiment, the network fabric 132 serves as an extension to the LAN 122. The LAN 122 and BMC 110 are further discussed below.

In one embodiment, the midplane 123 is mounted in the middle of the chassis of the server system 102 and contains circuitry and sockets 112 into which additional electronic devices or cards, including server blades 104, may be inserted. The midplane 123 includes at least one bus for secure in-band internal communication via the BMCs 110 and between the management modules 124 and the server blades 104 and/or amongst the server blades 104 themselves.

In one embodiment, when a server blade 104 is inserted into a specific socket 112, a physical address is established for the server blade 104. For example, assume that server blade 104a is inserted into the socket 112a. In one embodiment, control logic 116a detects presence of the server blade 104a in the socket 112a. The control logic 116a may comport with the Electronics Industry Association (EIA) RS485 Standard for data communication. In other embodiments, the control logic 116a may be compliant with the Phillips' Inter-IC (Inter-Integrated Circuit, or I²C) standard or with an Ethernet network standard. The control logic 116a, operating in conjunction with the management module 124a, assigns a physical address on a bus in the midplane 123 to the server blade 104a responsive to insertion of the server blade 104a into the socket 112a. As shown, each server blade 104 is associated with a respective control logic 116 that is operatively connected to the midplane 123. In an alternative embodiment, multiple server blades 104 may share a single control logic 116.

In one embodiment, each server blade 104 is assigned a unique Internet Protocol (IP) address on the midplane 123. That is, the midplane 123 may support intercommunication using IP addressing protocol, in which each device that is operatively connected to the midplane 123 has an IP address assigned by logic (not shown) that is either within or outside the chassis of the server system 102. For example, a Dynamic Host Configuration Protocol (DHCP) server may be used to assign an IP address to the server blade 104a. Communication with the server blade 104a thereafter occurs via a network interface controller (NIC) 114a associated with the server blade 104a. The NIC 114a may be any type of network communications device allowing the server blade 104a to communicate with other server blades 104b,n and/or computers via the LAN 122 and/or the network fabric 132.

In one embodiment, an integrated module 126a is operatively connected to the NIC 114a. The integrated module 126a may be used in pairs (e.g., with integrated module 126b) to provide redundancy. As is known, Small Computer System Interface (SCSI) refers to a set of standards for physically connecting and transferring data between computers and peripheral devices. In one embodiment, the integrated modules 126 include switch modules 128, such as a Serial Attached SCSI (SAS) switch module. The switch modules 128 provide, for the server blades 104, connectivity to Ethernet, Fibre Channel over Ethernet (FCoE), SAS, etc. In one embodiment, each switch module 128 is a switch chip. Depending on the embodiment, the integrated modules 126 may further include redundant array of independent disks (RAID) controllers 130. Each RAID controller 130 is interconnected to RAID devices, such as storage devices in a RAID configuration. The RAID devices may be located within one or more of the server blades 104. The RAID controllers 130 and the RAID devices may collectively be viewed as a RAID subsystem of the server system 102.

In one embodiment, each storage device may be a persistent storage device. Further, each storage device may be a combination of fixed and/or removable storage devices, such as fixed disc drives, floppy disc drives, tape drives, removable memory cards, solid-state drives or optical storage. The memory 108 and the storage device may be part of one virtual address space spanning multiple primary and secondary storage devices.

In one embodiment, each server blade 104 may have at least one central processing unit (CPU) 106 and a memory 108. The CPU 106 is included to be representative of a single CPU, multiple CPUs, a single CPU having multiple processing cores, and the like. Similarly, the memory 108 may be a random access memory. While the memory 108 is shown as a single identity, it should be understood that the memory 108 may comprise a plurality of modules, and that the memory 108 may exist at multiple levels, from high speed registers and caches to lower speed but larger DRAM chips. The memory 108 may be a flash read-only memory ("flash ROM" or "flash memory") that can be erased and reprogrammed in units of memory referred to as "blocks." The memory 108 may also include non-volatile Electrically Erasable Programmable Read Only Memory (EEPROM) that is similar to flash memory, except that EEPROM is erased and rewritten at a byte level and is usually smaller in capacity. Each server blade 104 may be oriented as a processor blade or a storage blade. A processor blade includes one or more processing devices, while a storage blade includes a number of integrated storage devices such as disk drives.

In one embodiment, when the server blade 104 is shipped from a manufacturer, the memory 108 may be pre-burned with firmware, including a basic input/output system (BIOS) and software for monitoring the server blade 104. The monitoring may include controlling storage devices, monitoring and controlling voltages throughout the system, determining the power-on status of the server blade 104, requesting access to a shared keyboard, video, mouse, compact disc read-only memory (CD-ROM) and/or floppy disk drives, monitoring the operating system (OS) running on the server blade 104, etc. Examples of operating systems include UNIX, versions of the Microsoft Windows® operating system, and distributions of the Linux® operating system. More generally, any operating system supporting the functions disclosed herein may be used.

In one embodiment, the management modules 124 are capable of detecting the presence, quantity, type and revision level of each server blade 104, power module 118, and midplane 123 in the system. The management modules 124 may also directly control the operation of each server blade 104 and the power module 118. The management modules 124 may also directly control the operation of cooling fans 120 and other components in the chassis of the server system 102. Directly controlling the operation entails controlling the operation without using the BIOS in the server blades 104. In an alternative embodiment, the management modules 124 may use the BIOS to indirectly control the operation of the cooling fans 120 and the other components in the chassis of the server system 102.

In one embodiment, each server blade 104 includes a baseboard management controller (BMC) 110 that provides local supervisory control of the server blade 104 to which the BMC 110 is associated. Each BMC 110 is configured to communicate with a management module 124 by either using communication path of the LAN 122 (i.e., via an in-band network) or alternatively by using switch modules 128 and NICs 114 (i.e., via an out-of-band network). The management modules 124 may utilize a variety of communications paths in the LAN 122, such as RS485 path, a LAN path, and an I²C path, to communicate with each server blade 104.

In one embodiment, the LAN 240 is an in-band network also comporting with the Electronics Industry Association (EIA) RS485 Standard for data communication. The management modules 124—e.g., either the primary management module 124a or the backup management module 124b if the primary management module 124a is down—communicate via the LAN 122 with the BMC 110, which includes logic for coordinating communication with the server blades 104 via the sockets 112.

In one embodiment, the LAN 122 may be configured to allow communications between the server blades 104 and the management modules 124 relating to the remote BIOS settings and BIOS management. The server blades 104 may use BMCs 110 as proxies to communicate with the management modules 124 through the RS485 protocol. Similarly, the management modules may use BMCs 110 as proxies to communicate with the server blades 104 through the RS485 protocol. In an alternative embodiment, an RS485 connection may be separately made between each server blade 104 and the management modules 124. Additionally, other communications protocols and paths may be utilized over the switch modules 128, such as I²C, TCP/IP, Ethernet, FCoE, etc.

Depending on the embodiment, the server system 102 may also be operatively connected to an input device and/or an output device. The input device may be any device for providing input to the server system 102. For example, a keyboard and/or mouse may be used. The output device may be any device for providing output to a user of the server system 102. For example, the output device may be any conventional display screen or set of speakers. Further, the input device and output device may be combined. For example, a display screen with an integrated touch-screen may be used.

In one embodiment, the management appliance 150 is configured to provide a global view of VPD to one or more users and/or applications. To this end, the management appliance 150 communicates with one or more local management controllers via the network fabric 132 and/or the LAN 122. Depending on the embodiment, the local management controllers may include the management modules 124 and the BMCs 110. The operations of the management appliance 150 and the local management controllers are further described below in conjunction with FIGS. 2-10.

Figure 2:
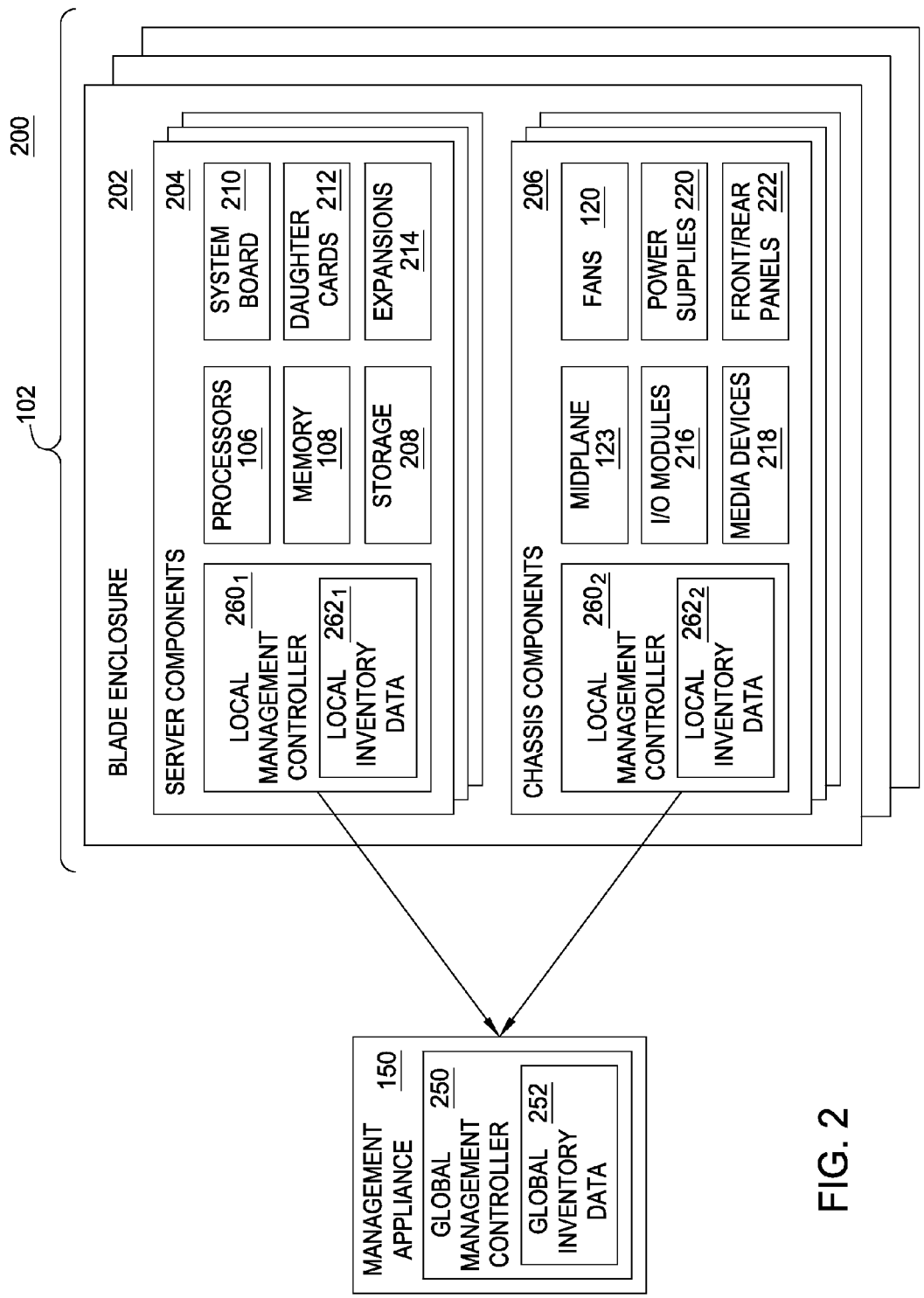
FIG. 2 illustrates a logical view of the management appliance and the server system, according to one embodiment of the invention.

FIG. 2 illustrates a logical view 200 of the management appliance 150 and the server system 102 of FIG. 1, according to one embodiment of the invention. As shown, the management appliance 150 includes a global management controller 250 configured to maintain global inventory data 252. The server system 102 includes multiple blade enclosures 202, each blade enclosure 202 housing server components 204 of one or more blades. Each blade enclosure 202 further houses one or more chassis components 206. The server system 102 also includes a plurality of local management controllers 260, each configured to manage a respective subset of components. Further, the subsets may be disjoint—i.e., each component has no more than one associated local management controller 260. Each subset of components may be predefined and tailored to suit the needs of a particular case.

In one embodiment, the server system 102 includes a local management controller $260_2$ for each blade enclosure and for each blade server. For example, the local management controller $260_2$ may be a chassis management module configured to manage the chassis components 206 of the blade enclosure 202. The chassis components 206 include the midplane 123, I/O modules 216, media devices 218, fans 120, power supplies 220, and front/rear panels 222 of the blade enclosure 202. As described above, the server system 102 may also include a local management controller $260_1$ for each blade server. For example, the local management controller $260_1$ may be a service processor configured to manage the server components 204 of the respective blade server. The server components 204 include the processors 106, memory 108, storage 208, system board 210, daughter cards 212 and expansions 214. Each local management controller 260 communicates with managed components to maintain local inventory data 262. The global management controller 250 communicates with the local management controllers 260 to maintain global inventory data 252.

Figure 3:
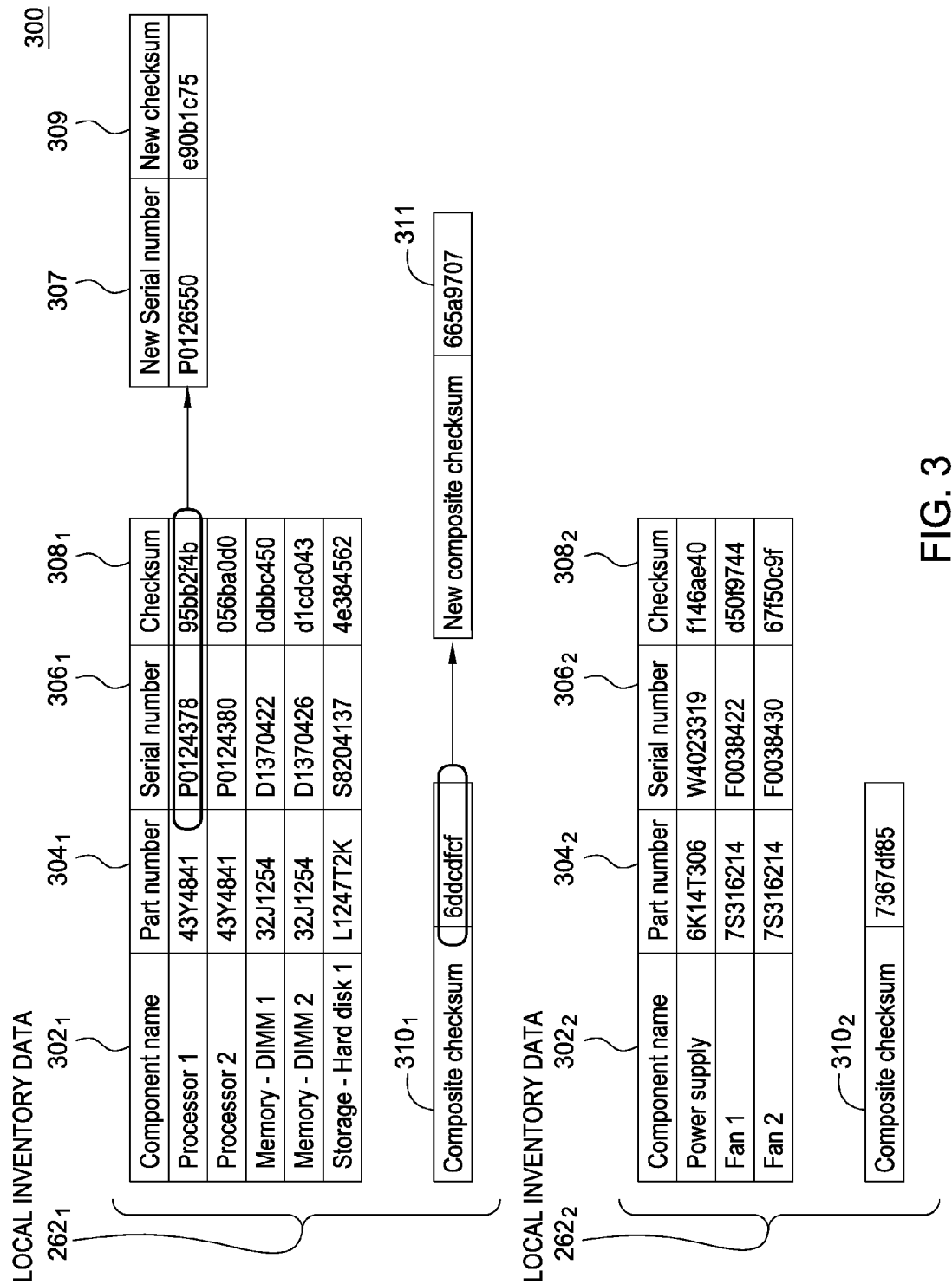
FIG. 3 illustrates local inventory data maintained by a local management controller, according to one embodiment of the invention.

FIG. 3 illustrates the local inventory data 262 of FIG. 2, according to one embodiment of the invention. As shown, the local inventory data $262_1$ that is maintained by the local management controller $260_1$ includes fields representing component name $302_1$, part number $304_1$ and serial number $306_1$, respectively. For example, the VPD of a first component managed by the local management controller $260_1$ is given by a component name $302_1$ of "Processor 1," a part number $304_1$ of "43Y4841," and a serial number $306_1$ of "P0124378." In one embodiment, each local management controller 260 is configured to retrieve the VPD from each component managed by the local management controller 260. The VPD may be retrieved according protocols and/or techniques specific to each component. For example, in the case of dual in-line memory module (DIMM) memory, the local management controller $260_1$ may retrieve VPD from an Electrically Erasable Programmable Read-Only Memory (EEPROM) using serial presence detect (SPD). Further, at least some of the VPD may be converted into a predefined format of the local inventory data 262.

In one embodiment, the local management controller $260_1$ is also configured to compute, for each component, a checksum $308_1$ based on (i) a predefined subset of fields associated with the component and, optionally, one or more predefined delimiters between the fields. As used herein, a checksum refers to a value of predefined size, that is computed from data and that may be used to detect changes in the data. Depending on the embodiment, the predefined subset of fields may include all fields associated with the component—e.g., the component name $302_1$, the part number $304_1$ and the serial number $306_1$. Examples of checksum algorithms include Fletcher's checksum, Adler-32 and cyclic redundancy checks (CRCs). Using a CRC algorithm to compute the checksums and/or composite checksums may reduce collision probabilities at least in some cases. A collision occurs when an identical checksum is generated from two distinct input values, respectively. At least in some embodiments, the odds of a collision under a CRC algorithm may be less than one in four billion.

In some embodiments, each field has an associated property characterizing whether the field is modifiable, and the predefined subset of fields only includes modifiable fields. For example, assume that the part number $304_1$ and the serial number $306_1$ are modifiable but the component name $302_1$ is not modifiable. In such a case, the checksum could be generated from only the modifiable fields—i.e., the part number $304_1$ and the serial number $306_1$ in this particular example. As used herein, a modifiable field may also be referred to as a mutable field, and a field that is not modifiable may also be referred to as an immutable field.

For example, a 32-bit checksum given by the hexadecimal value of "95bb2f4b" may be generated based on an input value of "43Y4841\nP0124378," where "\n" represents a delimiter value of the newline character. In general, any predefined string of character(s) may be used as the delimiter value. The input value is obtained by concatenating the part number of "43Y4841" with the delimiter and the serial number of "P0124378." The local inventory data $262_1$ also includes a composite checksum $310_1$ that is generated by the local management controller $260_1$ based on the checksums $308_1$ of all components managed by the local management controller $260_1$. For example, a 32-bit checksum given by the hexadecimal value of "6ddcdfcf" may be computed based on an input value of obtained from concatenating the five checksum values "95bb2f4b," "056ba0d0," "0dbbc450," "d1cdc043" and "4e384562," separated by the delimiter.

In an alternative embodiment, the component name $302_1$ is modifiable, and each component is associated with a "component identifier" field that is not modifiable. In the alternative embodiment, the checksum may be generated from the component name $302_1$, the part number $304_1$ and the serial number $306_1$. In one embodiment, to the extent that the checksums are used in detecting VPD changes, generating the checksum only from the modifiable fields may improve performance of the local management controllers and/or may reduce the probably of checksum collisions at least in some cases.

Similarly, the local inventory data $262_2$ maintained by the local management controller $260_2$ includes fields representing component name $302_2$, part number $304_2$, and serial number $306_2$, respectively. For example, the VPD of a first component managed by the local management controller $260_2$ is given by a component name $302_2$ of "Power supply," a part number $304_2$ of "6K14T306" and a serial number $306_2$ of "W4023319."

In one embodiment, the local management controller $260_2$ is configured to compute, for each component, a checksum $308_2$ based on a predefined subset of fields associated with the component. For example, a 32-bit checksum given by the hexadecimal value of "f146ae40" may be generated based on an input value of "6K14T306\nW4023319." The input value is obtained by concatenating the part number of "6K14T306" with the delimiter "\n" and the serial number of "W4023319." The local inventory data $262_2$ also includes a composite checksum $310_2$ that is generated by the local management controller $260_2$ based on the checksums $308_2$ of all components managed by the local management controller $260_2$. For example, a 32-bit checksum given by the hexadecimal value of "7367df85" may be computed based on an input value of obtained from concatenating the three checksum values "f146ae40," "d50f9744" and "67f50c9f," separated by the delimiter.

In one embodiment, one or more changes may occur to the VPD of a component in the server system 102. For instance, the serial number of a component may be updated by a user and/or an application, during a repair procedure involving the component. In one embodiment, each local management controller 260 is configured to poll components within the management scope of the respective local management controller 260. The frequency of polling may be configured by a user and tailored to suit the needs of a particular case. The local management controller may poll a component to retrieve VPD associated with the component.

In one embodiment, the retrieved VPD may be compared to VPD previously stored in the local inventory data 262, for the component. If the retrieved VPD is different from the stored VPD, then the local management controller 260 updates the local inventory data 262 using the retrieved VPD. In updating the local inventory data 262, the local management controller 260 also computes a new checksum based on the retrieved VPD. The local management controller 260 may also compute a new composite checksum, based at least in part on the new checksum. The local management controller 260 may then alert the global management controller 250 that a VPD change is detected. To this end, the local management controller 260 may send a message to the global management controller 250, where the message includes only the new checksum for the component and a unique identifier for the component. In other words, in this particular example, the message does not include any other VPD associated with the component. Additionally or alternatively, the message may include the new composite checksum 311. The message triggers an operation in which the global management controller 250 updates the global inventory data 252.

For instance, assume that the serial number for the component "Processor 1" is changed from "P0124378" to "P0126550," e.g., as part of a repair procedure involving the component. When the local management controller $260_1$ subsequently polls the component for VPD, the local management controller $260_1$ determines that the serial number has changed. The local management controller $260_1$ may then update the local inventory data $262_1$ with the new serial number 307. The local management controller $260_1$ may also update the local inventory data $262_1$ with a new checksum 309 computed at least in part based on the new serial number 307. The local management controller $260_1$ may also update the local inventory data $262_1$ with a new composite checksum 311 computed at least in part based on the new checksum 309. In this particular example, the new checksum 309 and the new composite checksum 311 are given by the hexadecimal values of "e90b1c75" and "665a9707," respectively.

In one embodiment, the local management controller $260_1$ may also send a message containing the component name of "Processor 1" and the new checksum of "e90b1c75" to the global management controller 250 as a notification of the VPD change. In some embodiments, the message may also contain additional fields identifying the local management controller $260_1$, blade, and/or enclosure, etc. As described above, the message triggers the process in which the global management controller 250 updates the global inventory data 252. The process is further described below in conjunction with FIGS. 5-8.

In one embodiment, apart from updating the global inventory data 252 to reflect VPD changes, the global management controller 250 may also update the global inventory data 252 to reflect entities being added to and/or removed from the server system 102. The entities may include components, local management controllers 260, servers, enclosures, etc. For example, upon polling a component or upon an occurrence of an interrupt, a local management controller 260 may discover that the component was removed from the server system 102. The local management controller 260 may remove the VPD (of the removed component) from the local inventory data 262 or, alternatively, flag the VPD as being deleted. The local management controller 260 may also alert the global management controller 250 to remove the VPD from the global inventory data 252. Additionally or alternatively, the local management controller 260 may generate a new composite checksum based on the checksums of the remaining components and provide the new composite checksum to the global management controller 250. The global management controller 250 may then store the new composite checksum in the global inventory data 252.

As a further example, a local management controller 260 may discover that a component was added to the server system 102 by polling a component when an interrupt occurs. The local management controller 260 may retrieve the VPD (of the removed component) and store the VPD to the local inventory data 262. The local management controller 260 may also alert the global management controller 250 to add the VPD to the global inventory data 252. Additionally or alternatively, the local management controller 260 may generate a new composite checksum based on the checksums of all managed components (including the newly added component) and provide the new composite checksum to the global management controller 250. The global management controller 250 may then store the new composite checksum in the global inventory data 252.

In some embodiments, if the global management controller 250 receives the message that includes the new composite checksum 311 and determines that the new composite checksum 311 matches a previous composite checksum for the local management controller 260, the global management controller 250 may not necessarily perform the operation for updating the global inventory data 252, despite the occurrence of the VPD change. Such situations may occur when an identical composite checksum is generated from two distinct sets of checksums. To trigger the operation for updating the global inventory data 252 in such situations, the local management controller 250 may be configured to send the message to the global management controller 250 upon a VPD change, even if the local management controller 250 determine that the new composite checksum 311 matches a previous composite checksum stored by the local management controller 250. Further, the global management controller 250 may be configured to perform the operation for updating the global inventory data upon receiving the message from the local management controller, regardless of whether the new composite checksum in the message matches the previous composite checksum stored by the global management controller 250. Further, at least in some embodiments, the operations of sending and/or receiving messages is independent of any transmission mediums and/or transmission protocols being used to send and/or receive the messages.

Although the above examples are described with reference to the local management controller 260 alerting the global management controller 250 of a VPD change by sending a new checksum, other embodiments are broadly contemplated. For example, in one embodiment, the local management controller 260 alerts the global management controller 250 of a VPD change by sending the changed VPD, rather than the new checksum. In another embodiment, the local management controller 260 alerts the global management controller 250 of a VPD change by first sending a new composite checksum associated with the local management controller 260. The global management controller 250 then retrieves one or more checksums from the local management controller 260 to identify the component which VPD has changed. The global management controller 250 then retrieves the changed VPD from the identified component.

Figure 4:
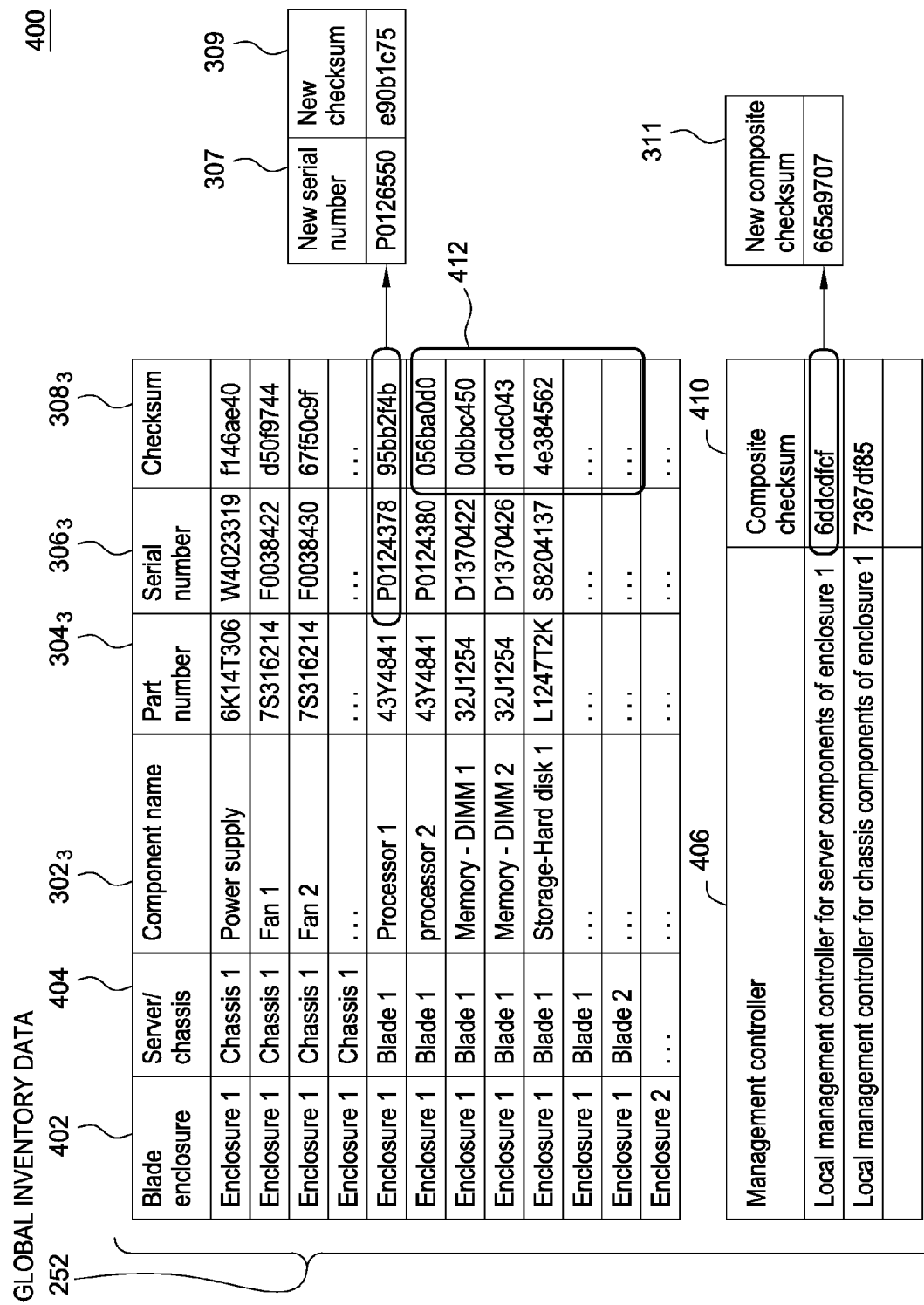
FIG. 4 illustrates global inventory data maintained by a global management controller, according to one embodiment of the invention.

FIG. 4 illustrates the global inventory data 252 of FIG. 2, according to one embodiment of the invention. As shown, the global inventory data 252 that is maintained by the global management controller 250 includes fields representing component name $302_3$, part number $304_3$ and serial number $306_3$, respectively. For example, the VPD of a first component managed by the global management controller 250 is given by a component name $302_3$ of "Processor 1," a part number $304_3$ of "43Y4841" and a serial number $306_3$ of "P0124378." The global inventory data 252 also includes a checksum $308_3$ for each component, where the checksum $308_3$ is generated by the local management controller 260 for the respective component. The global inventory data 252 may include additional fields identifying the enclosure 402 and/or server/chassis 404 associated with each component. Additionally or alternatively, the global inventory data 252 may include a field identifying a local management controller 260 configured to manage each component.

In one embodiment, the global inventory data 252 also includes, for each local management controller 260, a name 406 of the respective local management controller 260 and a composite checksum 410 generated by the respective local management controller 260. In general, any field(s) uniquely identifying the local management controller 260 may be used in lieu of the name 406. For example, a numerical management controller identifier may be used to associate a composite checksum 410 with a local management controller 260. Alternatively, a blade enclosure identifier and/or server/chassis identifier may be used.

As described above, upon detecting a change in the VPD of a component, the local management controller 260 sends a new checksum 309 and/or new composite checksum 311 to the global management controller 250. The message triggers a process in which the global management controller 250 updates the global inventory data 252 with the new checksum 309, the new composite checksum 311 and/or any changed VPD, such as the new serial number 307.

Figure 5:
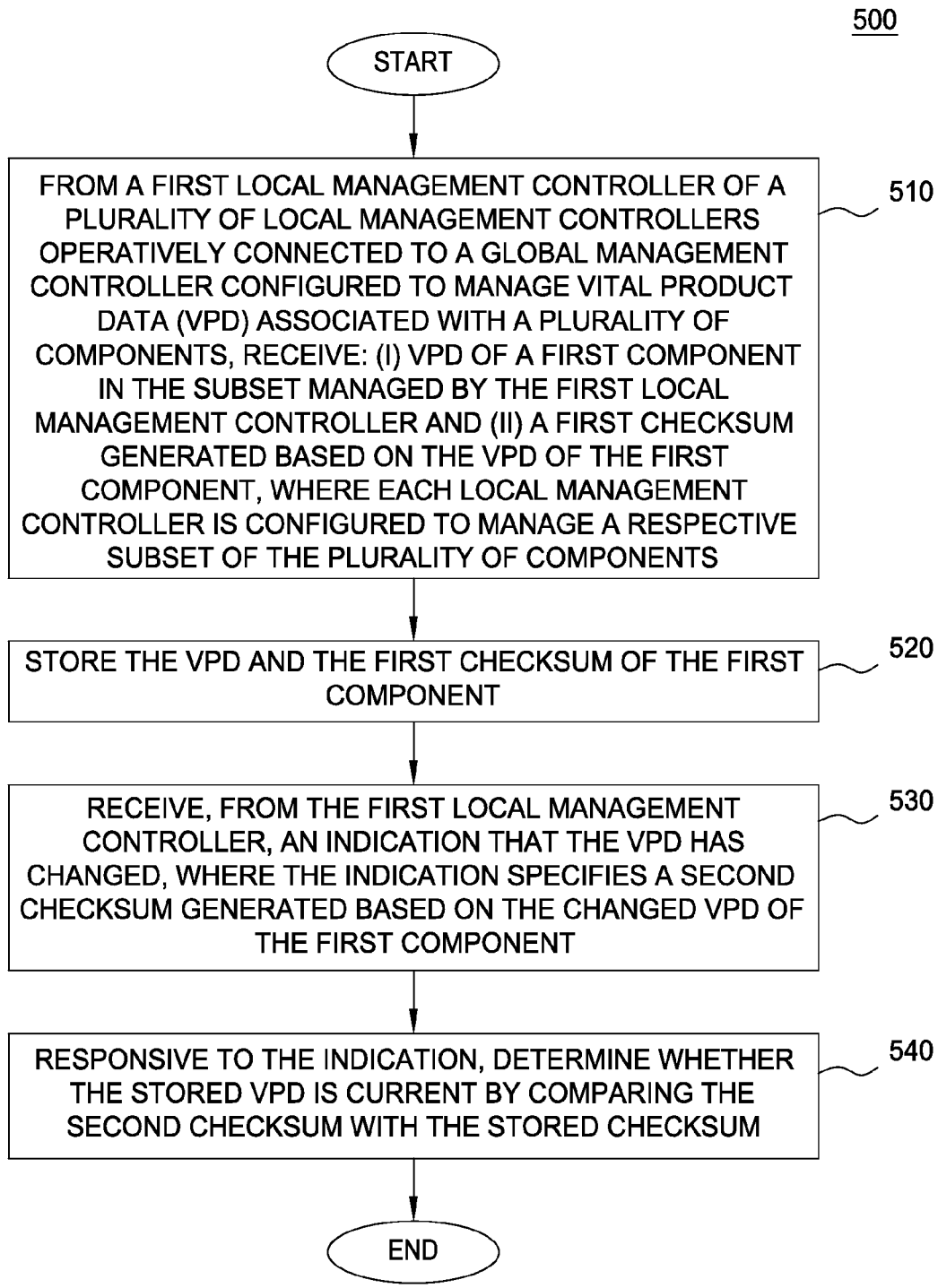
FIG. 5 is a flowchart depicting a method for maintaining the global inventory data, according to one embodiment of the invention.

FIG. 5 is a flowchart depicting a method 500 for maintaining the global inventory data 252, according to one embodiment of the invention. The steps of the method 500 may be performed by the global management controller 250, which is configured to manage VPD associated with a plurality of components of the server system 102 of FIG. 1. The global management controller 250 is connected to a plurality of local management controllers 260, each configured to manage a respective subset of the plurality of components of the server system 102. As shown, the method 500 begins at step 510, where the global management controller 250 receives VPD of a first component in the subset managed by a first local management controller $260_1$. The global management controller 250 also receives a first checksum generated by the first local management controller $260_1$ based on the VPD of the first component. For example, the global management controller 250 may receive the serial number $306_1$ and the checksum $308_1$ of FIG. 3.

At step 520, the global management controller 250 stores the VPD and the first checksum in the global inventory data 252. At step 530, the global management controller 250 receives, from the first local management controller $260_1$, an indication that the VPD has changed, where the indication specifies a second checksum generated based on the changed VPD of the first component. For example, the global management controller 250 receives the new checksum 309 of FIG. 3. At step 540, the global management controller 250 determines whether the stored VPD is current by comparing the second checksum with the stored checksum. For example, the global management controller 250 compares the new checksum 309 with the stored checksum $308_3$ of FIG. 4. After the step 540, the method 500 terminates.

Figure 6:
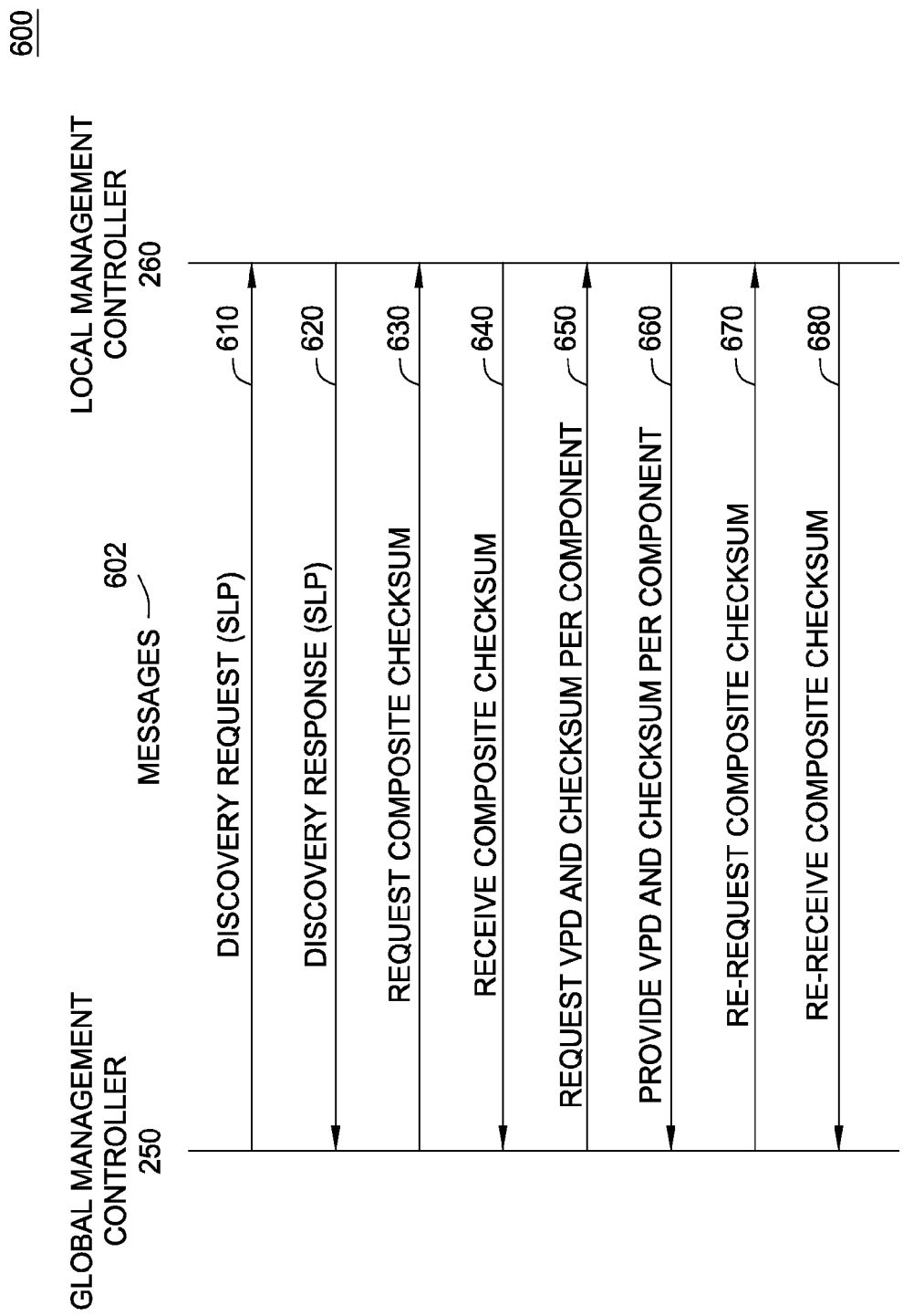
FIG. 6 is a sequence diagram illustrating an operation for generating the global inventory data, according to one embodiment of the invention.

FIG. 6 is a sequence diagram illustrating an operation 600 for generating the global inventory data 252 of FIG. 2, according to one embodiment of the invention. As shown, the operation begins at step 610, where the global management controller 250 sends a discovery request to a local management controller 260 in the server system 102. At step 620, the local management controller 260 sends a discovery response to the global management controller 250. Receipt of the discovery response allows the global management controller 250 to identify the local management controller 260 over the network. The request may and/or response may be composed according to a predefined protocol, such as Service Location Protocol (SLP). SLP refers to a service discovery protocol configured to allow computers to find services in a network, without requiring prior configuration of the computers and/or services.

At step 630, the global management controller 250 requests a composite checksum from the local management controller 260. At step 640, the local management controller 260 sends the composite checksum to the global management controller 250. For example, the local management controller 260 may send the composite checksum $310_1$ of FIG. 3. Alternatively, the local management controller 260 may indicate that the composite checksum is not yet available, in which case the global management controller 250 to repeat the step 630 after a predetermined time period has elapsed. At step 650, the global management controller 250 requests VPD and a checksum for each component managed by the local management controller 260. At step 660, the local management controller 260 provides the VPD and the checksum for each component managed by the local management controller 260. For example, the local management controller 260 may provide the part number $304_1$, serial number $306_1$ and the checksum $308_1$ of FIG. 3.

At step 670, the global management controller 250 re-requests a composite checksum from the local management controller 260. At step 680, the local management controller 260 sends the composite checksum to the global management controller 250. If the composite checksum at step 680 matches the composite checksum at step 660, then the VPD and/or checksums received by the global management controller 250 are current, relative to those stored by the local management controller 260. Accordingly, the global management controller 250 may return to the step 610 to identify a next local management controller in the server system 102. The global management controller 250 may repeat the operation 600 for each identified local management controllers.

Alternatively, if the composite checksum at step 680 does not match the composite checksum at step 660, then the VPD and/or checksums received by the global management controller 250 may be stale, relative to those stored by the local management controller 260. Accordingly, the global management controller 250 may repeat the steps 650-680 until the composite checksums match. Each VPD, checksum, and/or composite checksum received by the global management controller 250 is stored as part of the global inventory data 252. The global inventory data 252 may be stored in a persistent storage associated with the global management controller 250. Once the operation 600 is performed for all local management controllers 260 identified by the global management controller 250, then the global management controller 250 has completed generating the global inventory data 252.

Figure 7:
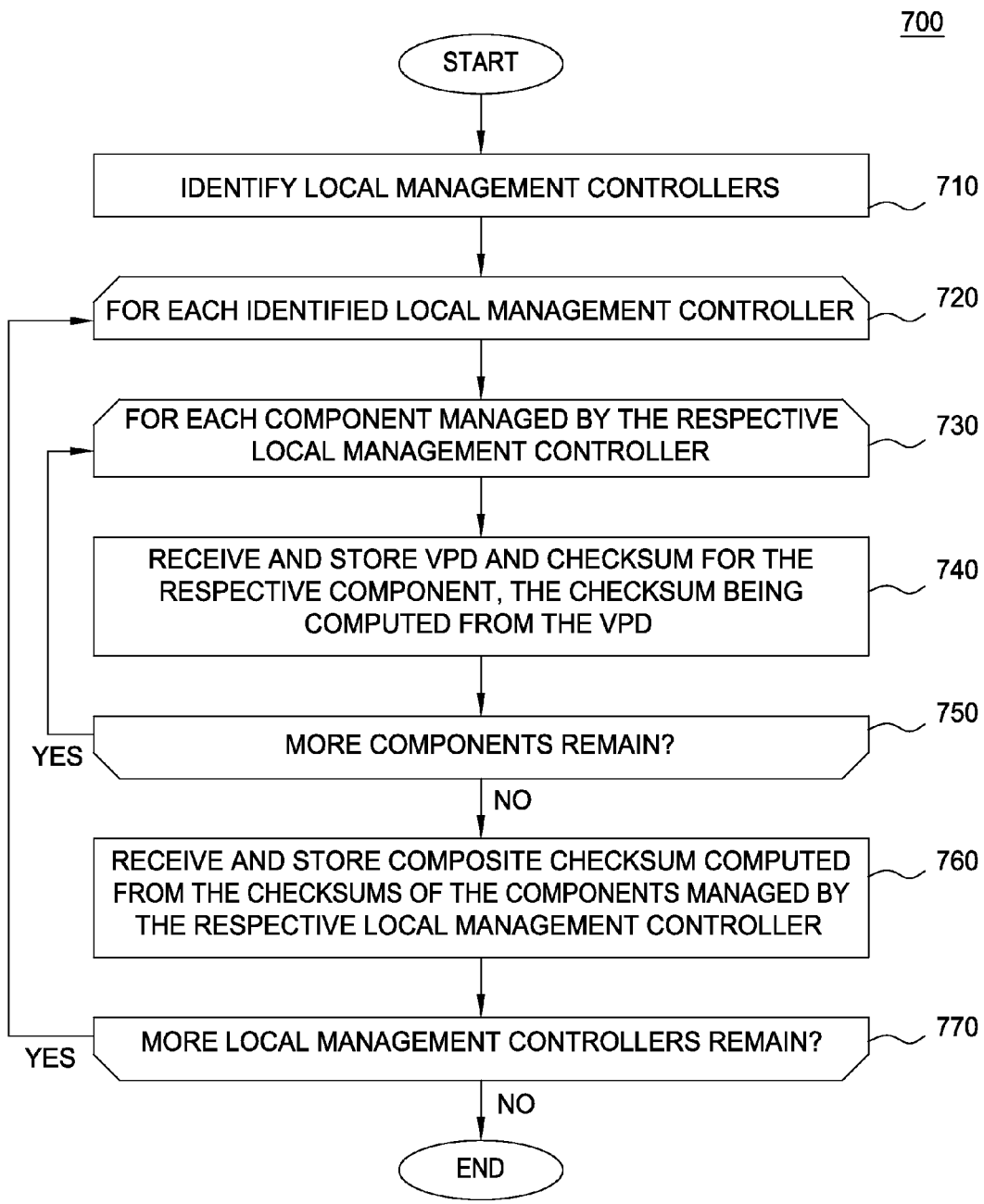
FIG. 7 is a flowchart depicting a method for generating the global inventory data, according to one embodiment of the invention.

FIG. 7 is a flowchart depicting a method 700 for generating the global inventory data 252 of FIG. 2, according to one embodiment of the invention. As shown, the method begins at step 710, where the global management controller 250 identifies the local management controllers 260 in the server system 102. At step 720, the global management controller 250 enters a first loop to process each identified local management controller 260. At step 730, the global management controller 250 enters a second loop to process each component managed by the respective local management controller 260. In an alternative embodiment, the respective local management controller 260 enters the second loop to provide VPD for each component managed by the respective local management controller 260. At step 740, the global management controller 250 receives and stores VPD and a checksum for the respective component. The checksum is generated by the respective local management controller 260, based on the VPD for the respective component.

If more components remain that are managed by the respective local management controller 260 (step 750), then the method 700 returns to the step 730 to process a next component managed by the respective local management controller 260. Otherwise, the method 700 proceeds to step 760, where the global management controller 250 receives and stores a composite checksum from the respective local management controller 260. The composite checksum is generated by the respective local management controller 260, based on VPD of all components managed by the respective local management controller 260. The global management controller 250 may store the received VPD, checksums and/or composite checksums as part of the global inventory data 252. If more local management controllers 260 remain to be processed (step 770), then the method 700 returns to the step 720 to process a next local management controller 260. Otherwise, generation of the global inventory data 252 is complete, and the method 700 terminates.

Figure 8:
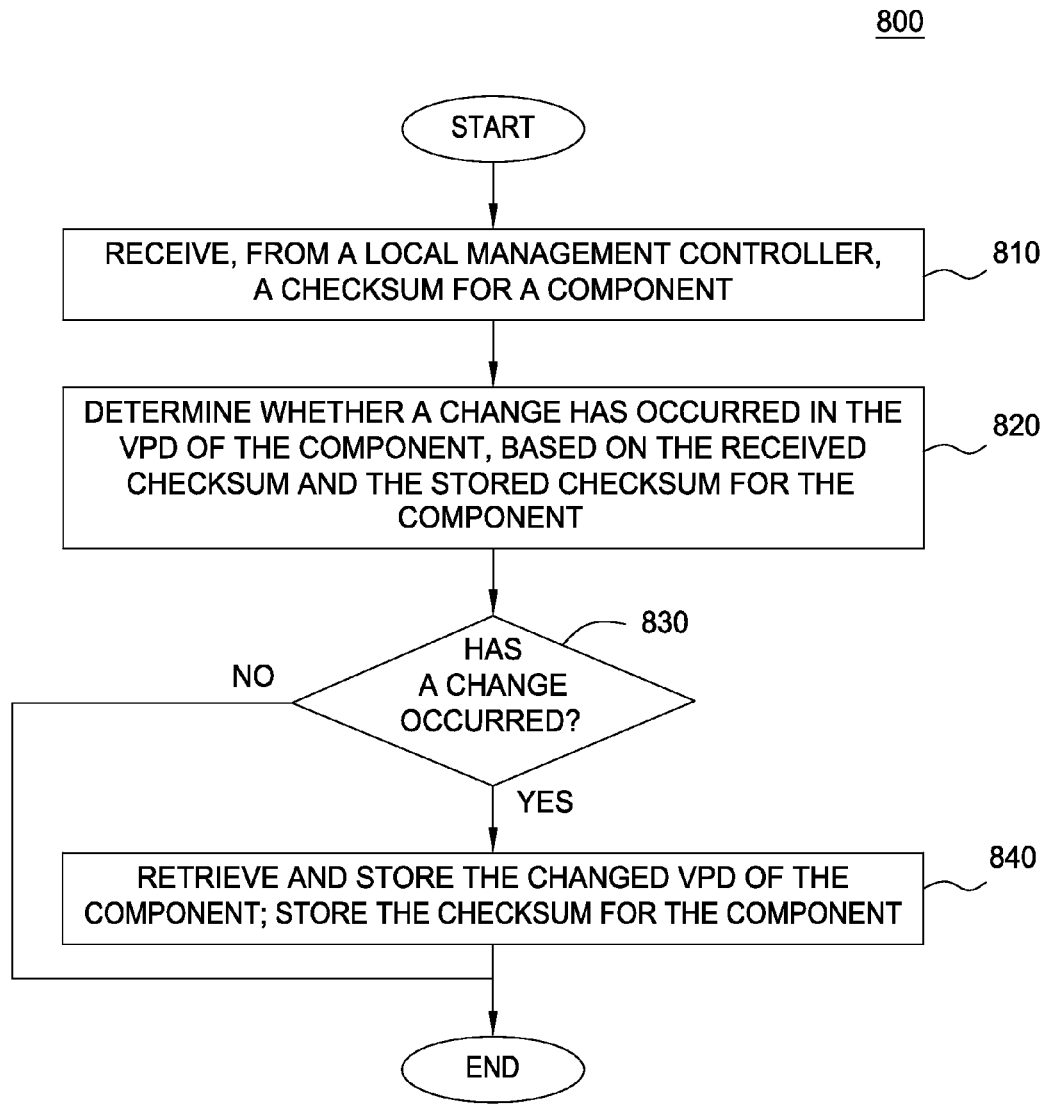
FIG. 8 is a flowchart depicting a method for maintaining the global inventory data, according to one embodiment of the invention.

FIG. 8 is a flowchart depicting a method 800 for maintaining the global inventory data 252 of FIG. 2, according to one embodiment of the invention. As shown, the method 800 begins at step 810, where the global management controller 250 receives, from a local management controller 260, a checksum for a component managed by the local management controller 260. For example, the global management controller 250 may receive the new checksum 309 of FIG. 4. At step 820, the global management controller 250 determines whether a change has occurred in the VPD of the component, based on the received checksum and the stored checksum for the component. For example, the global management controller 250 may determine that the serial number $306_3$ for "Processor 1" has changed, because the new checksum 309 for "Processor 1" does not match the stored checksum $308_3$ for "Processor 1."

If the global management controller 250 determines that a VPD change has occurred (step 830), the global management controller 250 stores the received checksum and retrieves and stores the changed VPD of the component (step 840). For example, the global management controller 250 updates the global inventory data 252 to include the new checksum 309 and the new serial number 307. The global management controller 250 may also retrieve and store the new composite checksum 311 in the global inventory data 252. At least in some embodiments, the step 840 is not performed unless the global management controller 250 determined that a VPD change has occurred. After the step 840, the method 800 terminates.

Figure 9:
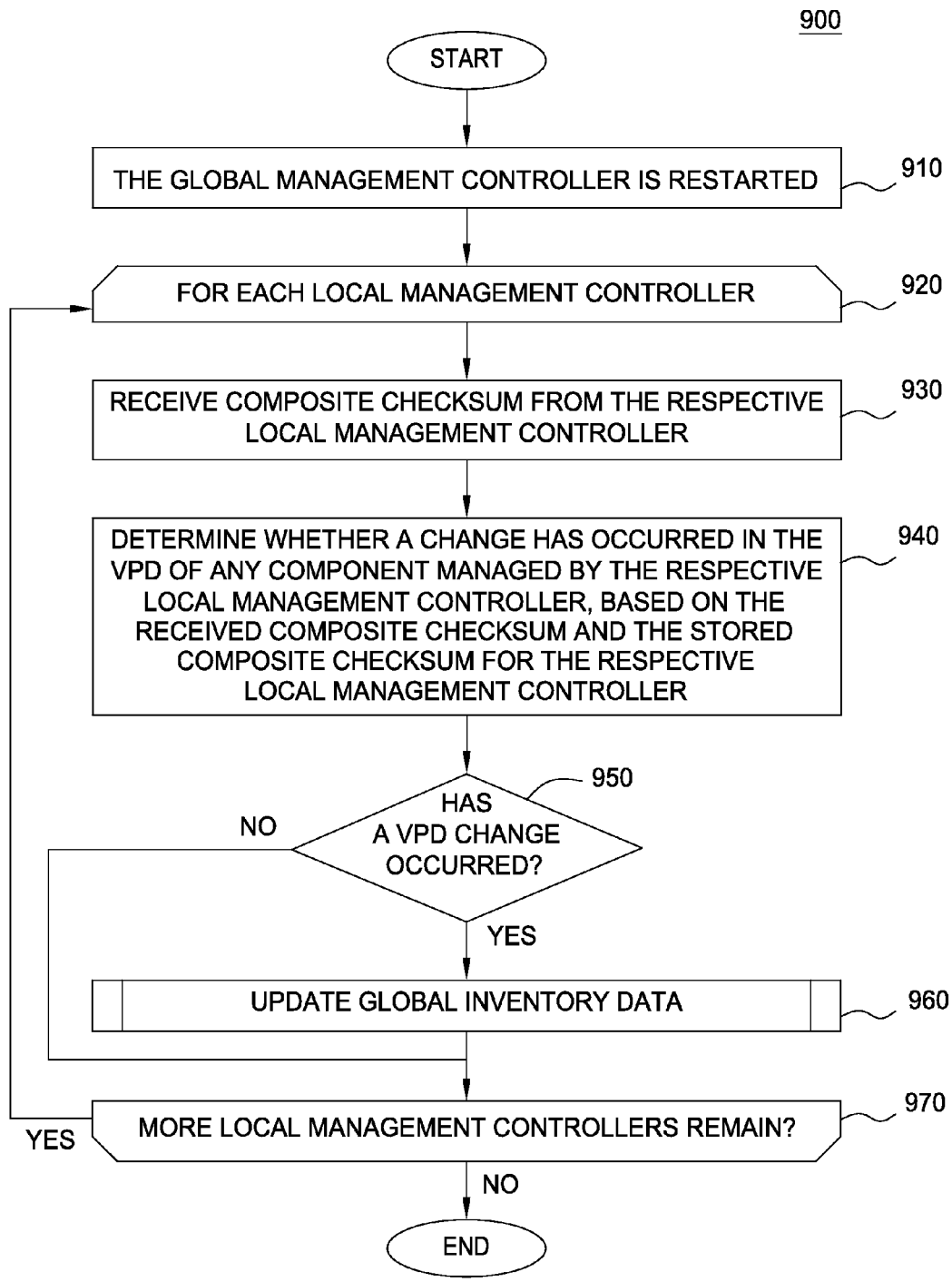
FIG. 9 is a flowchart depicting a method for bringing the global management controller up-to-date, following a restart of the global management controller, according to one embodiment of the invention.

FIG. 9 is a flowchart depicting a method 900 for bringing the global management controller up-to-date, following a restart of the global management controller, according to one embodiment of the invention. As shown, the method 900 begins at step 910, where the global management controller 250 is restarted. At step 920, subsequent to the global management controller 250 being restarted, the method 900 enters a loop to process each local management controller 260 previously identified by the global management controller 250. At step 930, the global management controller 250 receives a composite checksum from the respective local management controller 260. At step 940, the global management controller 250 determines whether a change has occurred in the VPD of any component managed by the respective local management controller 260, based on the received composite checksum and the stored composite checksum for the respective local management controller 260.

In one embodiment, matching composite checksums may indicate an absence of changes to the VPD of any component managed by the respective local management controller 260. Non-matching composite checksums may indicate that a VPD change has occurred for at least one component managed by the respective local management controller 260. If a VPD change has occurred (step 950), then the global management controller 250 updates the global inventory data 252 (step 960). The step 960 is further described below in conjunction with FIG. 10. At least in some embodiments, the step 960 is not performed unless a VPD change has occurred.

If additional local management controllers 260 remain to be processed (step 970), then the method 900 returns to the step 920 to process a next local management controller 260. Otherwise, the global management controller 250 has brought the global inventory data 252 fully up-to-date, relative to the identified local management controllers 260, and the method 900 terminates. In some embodiments, if there remain local management controllers 260 not previously identified by the global management controller 250, then the global management controller 250 may additionally perform the steps of the method 700 to update the global inventory data 252 to account for each such local management controller 260. Accordingly, the global inventory data 252 may be brought up-to-date relative to all local management controllers 260 in the server system 102, subsequent to a restart of the global management controller 250. Further, the global inventory data 252 may be brought up-to-date while minimizing or reducing the amount of VPD, checksums and/or composite checksums re-requested by the global management controller 250, relative to other embodiments in which persistent storage and/or checksums are not used. Accordingly, the global inventory data 252 may be brought up-to-date more efficiently at least in some cases.

Figure 10:
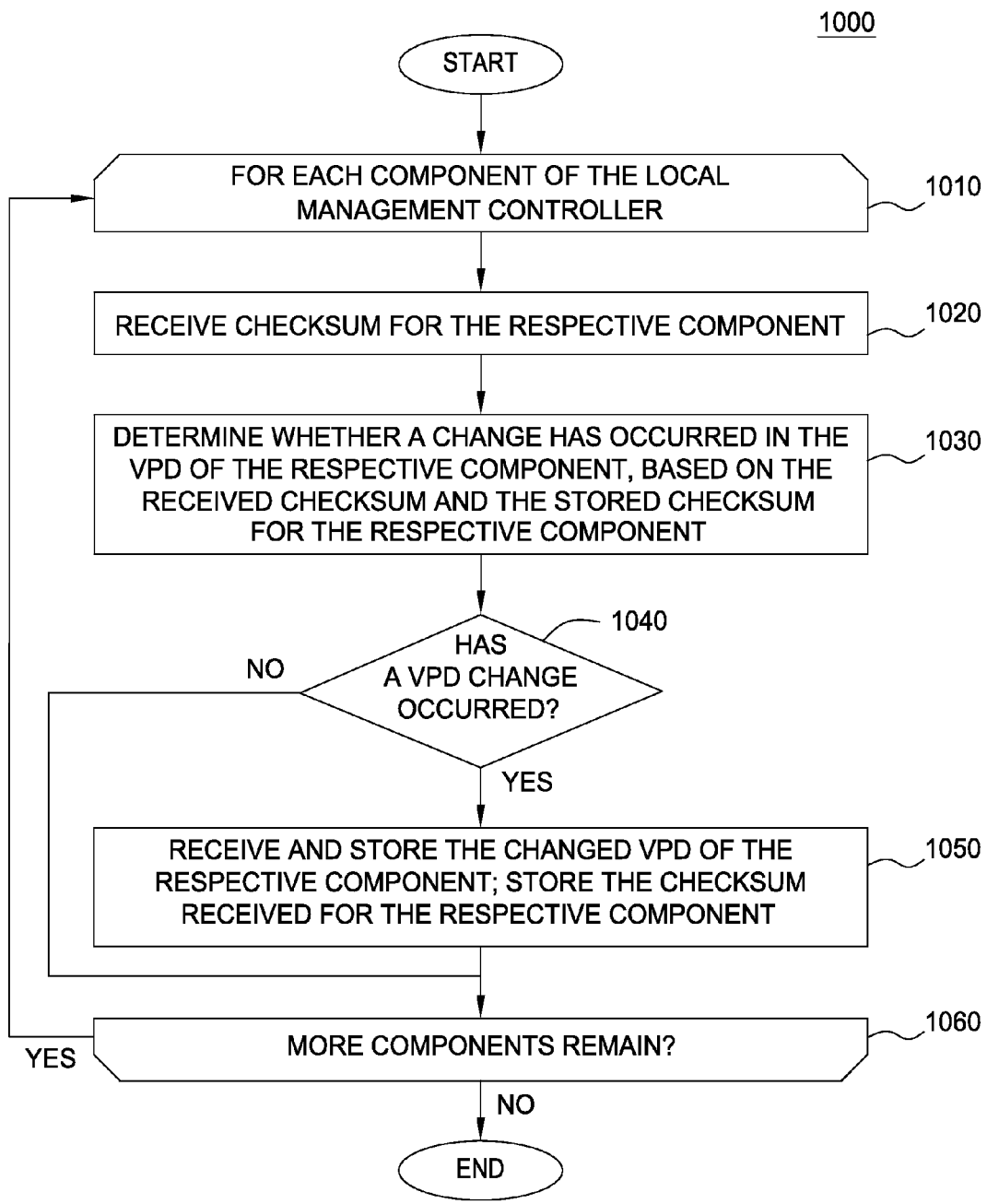
FIG. 10 is a flowchart depicting a method for updating the global inventory data, according to one embodiment of the invention.

FIG. 10 is a flowchart depicting a method 1000 for updating the global inventory data 252 of FIG. 2, according to one embodiment of the invention. The method 1000 corresponds to the step 960 of FIG. 9. As shown, the method 1000 begins at step 1010, where the global management controller 250 enters a loop to process each component of the local management controller 260. At step 1020, the global management controller 250 receives a checksum for the respective component. At step 1030, the global management controller 250 determines whether a change has occurred in the VPD of the respective component, based on the received checksum and the stored checksum of the respective component. If a VPD change has occurred (step 1040), the global management controller 250 stores the received checksum and/or retrieves and stores the changed VPD of the respective component. If additional components remain to be processed (step 1060), then the method returns to the step 1010 to process a next component managed by the respective local management controller 260. Otherwise, the global inventory data 252 has been brought fully up-to-date relative to the respective local management controller 260, and the method 1000 terminates.

In an alternative embodiment, instead of determining whether additional components remain to be processed at step 1060, the global management controller 250 may determine whether a composite checksum computed by the global management controller 250 for the local management controller 260 matches the received composite checksum from step 930 of FIG. 9. If the composite checksums match, then no further components need to be evaluated for the local management controller 260. In doing so, the global management controller 250 may bring the global inventory data 252 up-to-date more efficiently at least in some cases.

For example, referring again to FIG. 4, assume that the global management controller 250 updates the global inventory data 252 to include the new serial number 307 and the new checksum 309 for "Processor 1." Assume further that no other VPD change has occurred in the components managed by the local management controller $260_1$. Without computing a checksum for the local management controller $260_1$, the global management controller 250 would proceed to verify that the checksums 412 of the remaining components are up-to-date. On the other hand, by computing a composite checksum for the local management controller $260_1$, the global management controller 250 may avoid unnecessarily verifying the checksums 412 of the remaining components, upon determining that the computed composite checksum matches the received composite checksum 311. The composite checksum for the local management controller $260_1$ is computed based on the VPD of components managed by the local management controller $260_1$, where the VPD is retrieved from the global inventory data 252. Any processing overhead incurred by the global management controller 250 in generating the composite checksums may offset by not having to incur the processing and/or network costs in evaluating the checksums 412 of the remaining components, resulting in a net performance gain at least in some cases.

In some embodiments, the global management controller 250 is also configured to interoperate with one or more local management controllers that do not support checksums and/or composite checksums. For example, upon determining that a local management controller does not support checksums, the global management controller 250 polls the local management controller according to a predefined frequency, to retrieve VPD from one or more components managed by the local management controller. For instance, referring again to FIG. 6, the global management controller 250 may determine that the local management controller does not support checksums, upon not having received any response from the local management controller within a predetermined time period following the request for the composite checksum (step 630). Further, upon a restart of the global management controller 250, the global management controller 250 retrieves the VPD of each component managed by the local management controller and verifies that the stored VPD in the global inventory data 252 is current, relative to the retrieved VPD.

Advantageously, embodiments of the invention provide techniques for managing inventory data for components of a server system. One embodiment provides global management controller operatively connected to a plurality of local management controllers. Each local management controller is configured to manage a respective subset of the components of the server system. The global management controller is configured to manage VPD associated with the components of the server system. Each local management controller is further configured to generate a checksum for each component managed by the respective local management controller, based on the VPD associated with the respective component. Each local management controller is further configured to compute a composite checksum based on the checksums generated for the components managed by the respective local management controller.

In one embodiment, the global management controller may use the checksums and/or composite checksums to maintain a global view of the VPD in the server system, both during normal operation of the global management controller and/or subsequent to a restart of the global management controller. Accordingly, the global view may be maintained more conveniently and/or efficiently at least in some cases. For example, the checksums and/or composite checksums may be used to prevent unchanged VPD from being requested by the global management controller and/or sent by the local management controller.

While the foregoing is directed to embodiments of the present invention, other and further embodiments of the invention may be devised without departing from the basic scope thereof, and the scope thereof is determined by the claims that follow.

What is claimed is:

1. A computer-implemented method to manage component vital product data (VPD) using a plurality of local management controllers operatively connected, via a network, to a global management controller that is configured to manage a plurality of components, each local management controller configured to manage a respective subset of the plurality of components, each component having associated VPD, the computer-implemented method comprising:

receiving, from a first local management controller of the plurality of local management controllers: (i) respective VPD of a first and second components in the subset managed by the first local management controller; (ii) respective component checksums generated based on the VPDs of the first and second components; and (iii) a composite checksum specific to the first local management controller and generated based on the component checksums;

storing the VPDs, component checksums, and composite checksum by the global management controller;

receiving, from the first local management controller and subsequent to a restart of the global management controller, a current composite checksum specific to the first local management controller;

only upon determining, by operation of one or more computer processors, that the stored composite checksum is non-current, retrieving current component checksums of the first and second components, respectively;

comparing the retrieved current component checksums to the respective stored component checksum in order to identify at least one non-current stored component checksum; and then only for the at least one identified non-current stored component checksum, retrieving a current VPD of the respective component in order to update the stored VPD of the respective component, thereby reducing an amount of network traffic transmitted over the network subsequent to the restart.

2. The computer-implemented method of claim 1, further comprising, upon determining that the stored VPD associated with the subset is non-current:

identifying at least one component in the subset managed by the second local management controller, for which VPD stored by the global management controller is non-current; and updating the stored VPD of the identified at least one component using VPD retrieved from the second local management controller.

3. The computer-implemented method of claim 2, wherein the at least one component is identified by comparing a stored checksum of the at least one component with a subsequently retrieved checksum of the at least one component.

4. The computer-implemented method of claim 3, wherein each component is uniquely identifiable by an associated identifier, wherein each identifier is immutable, and wherein each checksum is generated via a cyclic redundancy check (CRC) algorithm.

5. The computer-implemented method of claim 4, further comprising:

determining that the stored VPD associated with the subset managed by the second local management controller is current, whereupon no VPD associated with the subset managed by the second local management controller is retrieved by the global management controller from the second local management controller, thereby further reducing the amount of network traffic transmitted over the network subsequent to the restart of the global management controller.

6. The computer-implemented method of claim 5, wherein upon determining that the stored VPD associated with the subset managed by the second local management controller is current, none of the plurality of checksums is retrieved by the global management controller from the second local management controller, thereby still further reducing the amount of network traffic transmitted over the network subsequent to the restart of the global management controller.

7. The computer-implemented method of claim 6, wherein the global management controller is configured to store global inventory data including VPD, checksums, and composite checksums, wherein each local management controller is configured to store respective local inventory data including VPD, checksums, and composite checksums, wherein the global inventory data and each local inventory data are stored in persistent storage, whereby the global inventory data and each local inventory data need not be regenerated upon the restart of the global management controller.

8. The computer-implemented method of claim 7, wherein the first local management controller and the second local management controller are configured to execute on a server operatively connected to a management appliance and a plurality of hosts, wherein the server includes a plurality of blade enclosures comprising a plurality of server blades, wherein each server blade is operatively connected to a midplane, wherein the plurality of components includes server components and chassis components, wherein the management appliance is external to the server, wherein each server blade has an associated network interface controller and is assigned an unique network address, wherein each network interface controller is operatively connected to an integrated module comprising a switch module, wherein the management appliance is configured to provide a global view of VPD to one or more applications executing on the plurality of hosts, wherein the global management controller executes on the management appliance to provide the global view of VPD, wherein the local management controllers execute on the plurality of server blades.

9. The computer-implemented method of claim 8, wherein the global inventory data includes, for each component, a first plurality of fields including:

(i) an indication of a blade enclosure housing the respective component;

(ii) an indication of a server blade to which the respective component belongs;

(iii) an indication of the respective component;

(iv) a part number of the respective component;

(v) a serial number of the respective component; and (vi) a checksum of the VPD of the respective component.

10. The computer-implemented method of claim 9, wherein the global inventory data further includes, for each local management controller, a second plurality of fields including:

(i) an indication of the respective local management controller; and (ii) a composite checksum of VPD of the subset of components managed by the respective local management controller.

11. The computer-implemented method of claim 10, wherein each local inventory data includes, for each component managed by the local management controller storing the respective local inventory data, a third plurality of fields including:

(i) an indication of a blade enclosure housing the respective component;

(ii) an indication of a server blade to which the respective component belongs;

(iii) an indication of the respective component;

(iv) a part number of the respective component;

(v) a serial number of the respective component; and (vi) a checksum of the VPD of the respective component.

12. The computer-implemented method of claim 11, wherein the first plurality of fields and the second plurality of fields are delineated by a predefined delimiter character in the global inventory data, wherein CRC algorithm via which each checksum is generated has a collision probability below a predetermined threshold, wherein the first plurality of fields includes modifiable fields and unmodifiable fields, wherein checksums are generated based on the modifiable fields and not based on any of the unmodifiable fields.

13. The computer-implemented method of claim 12, wherein each subset of components is disjoint, such that each component is managed by one respective local management controller, wherein each checksum and each component checksum has a predefined length in bytes.

14. The computer-implemented method of claim 13, wherein each local management controller is configured to, in respective instances, update the respective local inventory data upon: (i) a first component undergoing a VPD change; (ii) a second component being added to the server; and (iii) a third component being removed from the server; wherein the global management controller is configured to update the global inventory data upon receiving a respective indication from the respective local management controller.

15. The computer-implemented method of claim 14, wherein the second local management controller is configured to, upon: (i) the global management controller determining that the stored VPD associated with the subset managed by the second local management controller is current and (ii) the second local management controller determining that a composite checksum collision has occurred:
    forcing the global management controller to request the checksum and the VPD of at least one component managed by the second local management controller, despite the determination by the global management controller that the stored VPD is current.

16. The computer-implemented method of claim 15, wherein the global inventory data is kept current while reducing respective counts of VPD, checksums, and composite checksums transmitted over the network upon restart of the management appliance;
    wherein the global inventory data is generated via: (i) a plurality of discovery requests by the global management controller and (ii) a plurality of discovery responses by the plurality of local management controllers and responsive to the plurality of discovery requests; wherein the plurality of discovery requests and the plurality of discovery responses comply with a predefined protocol, wherein the predefined protocol comprises Service Location Protocol (SLP).

17. The computer-implemented method of claim 16, wherein at least one of the plurality of discovery responses indicates that a composite checksum is not yet available, responsive to which the global management controller is configured to resend a discovery request after a predetermined time period has elapsed.

18. The computer-implemented method of claim 17, wherein the global management controller is configured to:
    determine that a given local management controller of the plurality of local management controllers does not support checksums, based on the global management controller not receiving any response from the given local management controller within a predetermined time period following a request by the global management controller for a composite checksum.

19. The computer-implemented method of claim 18, wherein the global management controller is further configured to:
    retrieve the VPD of each component managed by the given local management controller; and
    verify that the VPD of each component managed by the given local management controller is current subsequent to the management appliance begin restarted, by comparing the retrieved VPD of the respective component with the stored VPD for the respective component and not by comparing any composite checksums and not by comparing any checksums.

20. The computer-implemented method of claim 19, whereby non-current VPDs are updated using current VPDs, wherein the non-current stored composite checksum is updated using the current composite checksum, wherein the non-current stored component checksums are updated using the current component checksums.

* * * * *